United States Patent [19]

Matsuoka et al.

[11] Patent Number: 5,267,226
[45] Date of Patent: Nov. 30, 1993

[54] OPTICAL INFORMATION RECORDING AND REPRODUCING APPARATUS WITH SWITCHABLE SPOT-FUNCTIONS

[75] Inventors: Kazuhiko Matsuoka, Yokohama; Hideki Hosoya, Kawasaki, both of Japan

[73] Assignee: Canon Kabushiki Kaisha, Tokyo, Japan

[21] Appl. No.: 4,674

[22] Filed: Jan. 14, 1993

Related U.S. Application Data

[63] Continuation of Ser. No. 742,488, Aug. 5, 1991, abandoned, which is a continuation of Ser. No. 279,087, Dec. 2, 1988, abandoned.

[30] Foreign Application Priority Data

Dec. 3, 1987 [JP] Japan ............... 62-304570

[51] Int. Cl.⁵ .................................................. G11B 7/08
[52] U.S. Cl. ........................... 369/44.11; 235/454; 369/44.29; 369/44.27; 369/44.37
[58] Field of Search ........... 235/454, 455, 475, 476, 235/487, 477, 470; 369/54, 58, 47, 48, 116, 120, 124, 44.37, 44.38, 44.27, 44.29, 44.31, 44.11

[56] References Cited

U.S. PATENT DOCUMENTS

| | | | |
|---|---|---|---|
| 4,494,226 | 1/1985 | Hazel et al. ............. | 369/58 |
| 4,571,716 | 2/1986 | Szerlip ..................... | 369/58 |
| 4,598,393 | 7/1986 | Pierce et al. ............. | 369/116 |
| 4,730,293 | 3/1988 | Pierce et al. . | |
| 4,787,075 | 11/1988 | Matsuoka et al. . | |
| 4,825,059 | 4/1989 | Kurihara et al. ........ | 235/483 |
| 4,881,214 | 11/1989 | Izawa et al. ............. | 369/44.38 |
| 5,027,337 | 6/1991 | Takahashi et al. ...... | 369/44.27 |

FOREIGN PATENT DOCUMENTS 61-242336 10/1986 Japan .

*Primary Examiner*—Robert A. Weinhardt
*Attorney, Agent, or Firm*—Fitzpatrick, Cella, Harper & Scinto

[57] ABSTRACT

According to the optical information recording and reproducing apparatus of the present invention, in an optical information recording and reproducing apparatus for recording and/or reproducing information while performing a relative reciprocating movement between a recording and/or reproducing head and an optical information recording medium having information tracks, plural spots including a spot having the function of recording and/or reproducing information formed on said recording medium by said head are arranged so as to be located on the same information track in said recording medium. Further, by switching the functions which at least two spots have during forward movement and during backward movement of said relative movement, it is possible to arrange the spots having roles in accordance with the recording and reproducing apparatus and have them function in a predetermined order. Thus, the present invention has an effect that a stable and correct recording and/or reproduction of information with high speed becomes possible.

18 Claims, 7 Drawing Sheets

41: INFORMATION TRACKS

OPTICAL INFORMATION RECORDING AND REPRODUCING APPARATUS WITH SWITCHABLE SPOT-FUNCTIONS

This application is a continuation of application Ser. No. 07/742,488 filed Aug. 5, 1991, now abandoned, which is a continuation of application Ser. No. 07/279,087 filed Dec. 2, 1988, now abandoned.

BACKGROUND OF THE INVENTION

1. Field of the Invention

This invention relates to an optical information recording and reproducing apparatus for recording and/or reproducing information on optical information recording media. This invention is particularly suitable for an optical card recording and reproducing apparatus which records and reproduces information while relatively reciprocating an optical head and an optical card.

2. Description of the Prior Art

As forms of media for recording and reproducing information using light, there have been known several kinds of media, such as the optical disk, the optical card, the optical tape and the like. Each of these media has different features and is being used according to its proper objects and applications. It is considered, however, that among these media, the optical card will find increasing applications in the future because of its features, such as easiness of production, excellent portability and excellent accessibility.

FIG. 1 is a schematic block diagram exemplifying an optical information recording and reproducing apparatus configured for the above-described card-like optical information recording media. This apparatus is disclosed in U.S. patent application Ser. No. 921,488 (filed Oct. 22, 1986, which issued as U.S. Pat. No. 4,825,059 on Apr. 25, 1989.

In FIG. 1, there are shown an optical card 1 in which information is to be recorded, an optical head 3 (the region surrounded by dotted lines in FIG. 1), a light beam 4, a shuttle 5 for mounting the optical card 1, a laser light source 8 and a collimating lens 9. By a combination of a polarizing beam splitter 10 and a ¼ wavelength plate 30, a light passing from down to up in FIG. 1 is transmitted, but a light beam passing from above to below is deflected in a perpendicular direction. An objective lens 11 focuses parallel light on the optical card 1.

There are also shown a photosensor 12, a preamplifier 13, an auto-focusing servo 14, an auto-tracking servo 15, a decoder 16, an interface 17, a computer 18, an encoder 19 and a laser driver 20. A stepping motor 21 moves the optical head 3 in the direction perpendicular to the surface of the paper.

A belt 24 is mounted on pulleys 22 and 23. A shuttle 5 for supporting and fixing the optical card 1 is mounted on the belt 24. The pulley 22 is mounted on the shaft of a motor 26, and the optical card 1 reciprocates in the direction of bilateral arrow A in FIG. 1 by the revolution of the motor 26.

Next, the operation of the apparatus shown in FIG. 1 will be explained by illustrating a case of information reproduction.

In FIG. 1, a light beam output by the laser 8 is made a parallel light beam by the collimating lens 9, passes through the polarizing beam splitter 10 and the ¼ wavelength plate 30, is condensed by the objective lens 11 and forms a minute spot on the optical card 1. The light reflected from the optical card 1 is modulated depending on whether an information pit exists or not in the portion irradiated with the minute spot. The modulated light is again made a parallel light beam by the objective lens 11, and is projected onto the photosensor 12 by the polarizing beam splitter 10. The photosensor 12 detects variations of the amount of light of the modulated light, converts them into electrical signals and sends the signals to the preamplifier 13. The signals are then sent from the preamplifier 13 to the auto-focusing servo 14. By the signals from the auto-focusing servo 14, an actuator (not illustrated) moves the objective lens 11 in the direction of bilateral arrow B, and controls the distance between the objective lens 11 and the optical card 1 so that the light beam 4 focuses on the optical card 1.

The signals from the preamplifier 13 are also sent to the auto-tracking servo 15. By the signals from the autotracking servo 15, an actuator (not illustrated) moves the objective lens 11 in the direction perpendicular to the surface of the paper, and controls so that the light beam 4 focuses on a predetermined position. At the initial operation of the apparatus, servo-draw-in command is sent from the interface 17 to the auto-focusing servo 14 and the auto-tracking servo 15. Some concrete methods have been proposed relative to the auto-focusing servo 14 and the auto-tracking servo 15. In one proposal, for example, the light beam 4 is divided into plural beams by a grating or the like. Tracks for auto-focusing or auto-tracking have previously been preformatted in the optical card 1. Information is reproduced by at least one of the plural light beams, and signals for auto-focusing and auto-tracking are taken out by other light beams. Further, signals from the preamplifier 13 are sent to the decoder 16 and subjected to necessary electrical processing, and subsequently are sent to the interface 17. Information signals are sent from the interface 17 to the computer 18. Signals are also sent from the interface 17 to the encoder 19, and after being modulated whenever necessary, control the oscillation of the laser 8 through the laser driver 20.

Further, signals are sent from the interface 17 to the stepping motor 21 and a motor servo 27, and the position control of the optical head 3 in the direction perpendicular to the surface of the paper and the rotation control of the motor 26 are performed.

In an optical card recording and reproducing apparatus which performs the operation described above, reliability is required such that information can be stably and correctly recorded in optical cards. In order to stably record, an apparatus may be configured so that recorded information pits are reproduced by another spot to confirm whether information has been correctly recorded or not. As such an optical information recording and reproducing apparatus provided with such a spot for monitoring, there is an apparatus shown in U.S. Pat. No. 4,667,316. The disposition of spots in this apparatus is shown in FIG. 2. In FIG. 2, there are shown information tracks 41. On a given information track, a first spot 42 for recording information, and a second spot 45 for reproducing in order to judge immediately after recording whether information recorded as a pit 46 has been recorded correctly or not, are located. Accordingly, even when there is a foreign matter on the information track, it is possible to immediately perform a corrected recording on a new information track 41 on the occasion of a wrong recording, by reproducing the recorded information pit 46 by the second spot 45 and judging whether recording has been correctly performed or not.

However, when the apparatus having a configuration shown in FIG. 2 is applied to an optical card recording and reproducing apparatus in which an optical head and an optical card relatively reciprocate, there is a disadvantage that the recording speed becomes remarkably low. That is, when the roles of the first spot and the second spot are fixed as shown in FIG. 2, recording is necessarily performed during forward movement (or during backward movement, but not both). Consequently, in order to record on two information tracks, the optical head and optical card must accomplish two reciprocating motions. This necessity causes the inconvenience that recording time becomes too long when a large amount of information is recorded.

SUMMARY OF THE INVENTION

The present invention has been made taking into consideration the above-described problems. That is, it is an object of the present invention to provide an optical information recording and reproducing apparatus which is capable of stably and correctly recording information without reducing the recording speed of information.

The above-described object can be achieved, in an optical information recording and reproducing apparatus for recording and/or reproducing information while relatively reciprocating a head for recording and/or reproducing and an optical information recording medium having information tracks, by an optical information recording and reproducing apparatus wherein plural spots, including a spot having the function of recording and/or reproducing information formed on said recording medium by said head are disposed so that they are located on a single (i.e., the same) information track in said recording medium, and the functions which at least two spots among said plural spots have can be switched in accordance with the forward relative movement and the backward relative movement between the spot-forming means and the recording medium (hereinafter, "forward movement" and "backward movement" are respectively used in place of "forward relative movement" and "backward relative movement", for convenience).

The present invention has a feature that, by switching the functions which at least two spots among said plural spots have, in accordance with the instantaneous direction of the relative movement at the forward movement and the backward movement, each spot having a predetermined function is arranged and made to function in a predetermined order.

For example, in an information recording and reproducing apparatus as that illustrated in FIG. 2, by switching the functions which the first spot and the second spot have, the operations of information recording and confirmation after recording become possible both during forward movement and during backward movement. Consequently, it is possible to record in two information tracks by one reciprocating movement, and thus the recording speed of information is doubled compared with the conventional example described above.

DESCRIPTION OF THE PREFERRED EMBODIMENTS

The optical information recording and reproducing apparatus of the present invention will be hereinafter explained in detail according to concrete embodiments.

Figure 3:
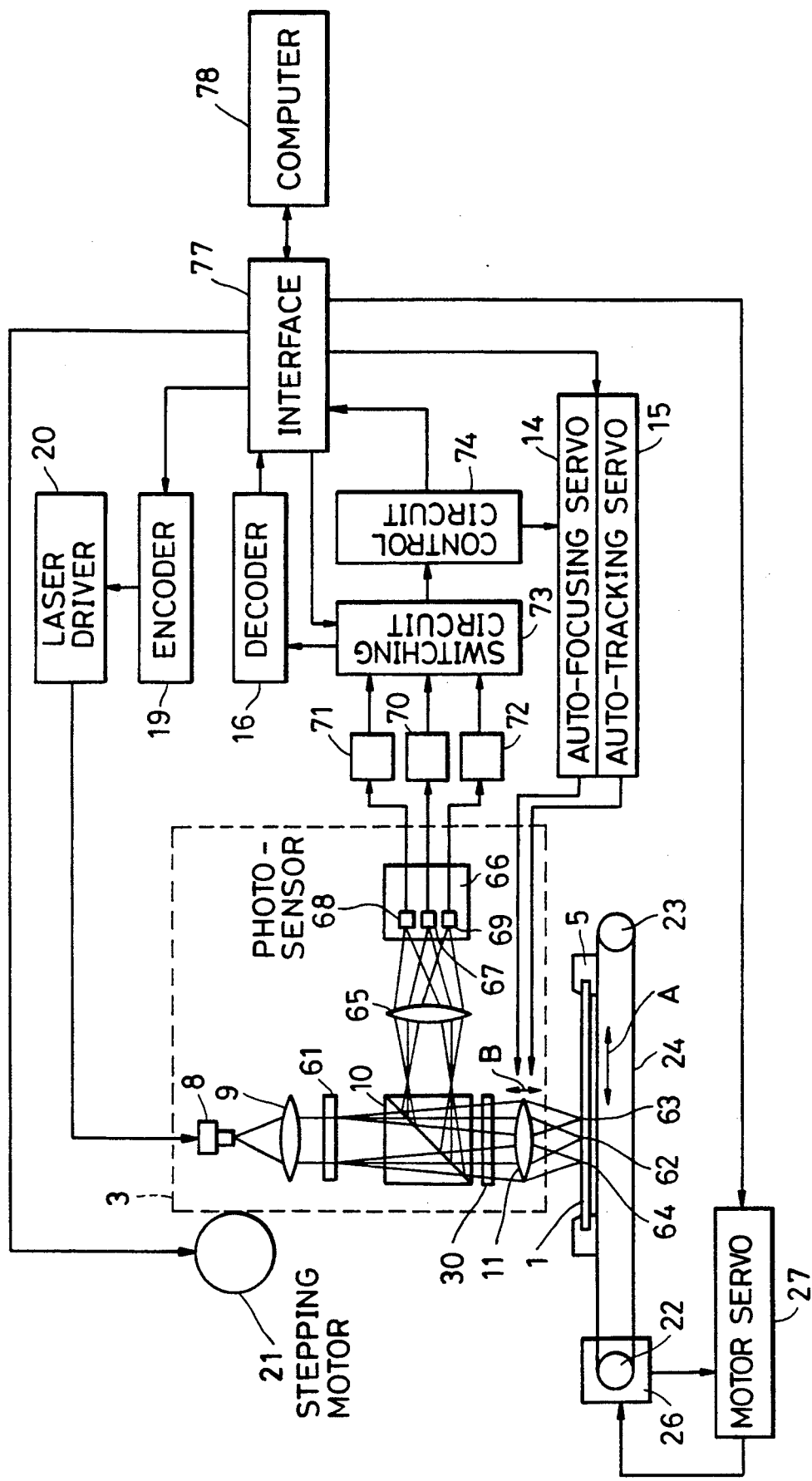
FIG. 3 is a diagram showing an optical information recording and reproducing apparatus as an embodiment of the present invention.

FIG. 3 is a schematic configurational diagram showing an optical information recording and reproducing apparatus of the present invention.

Figure 1:
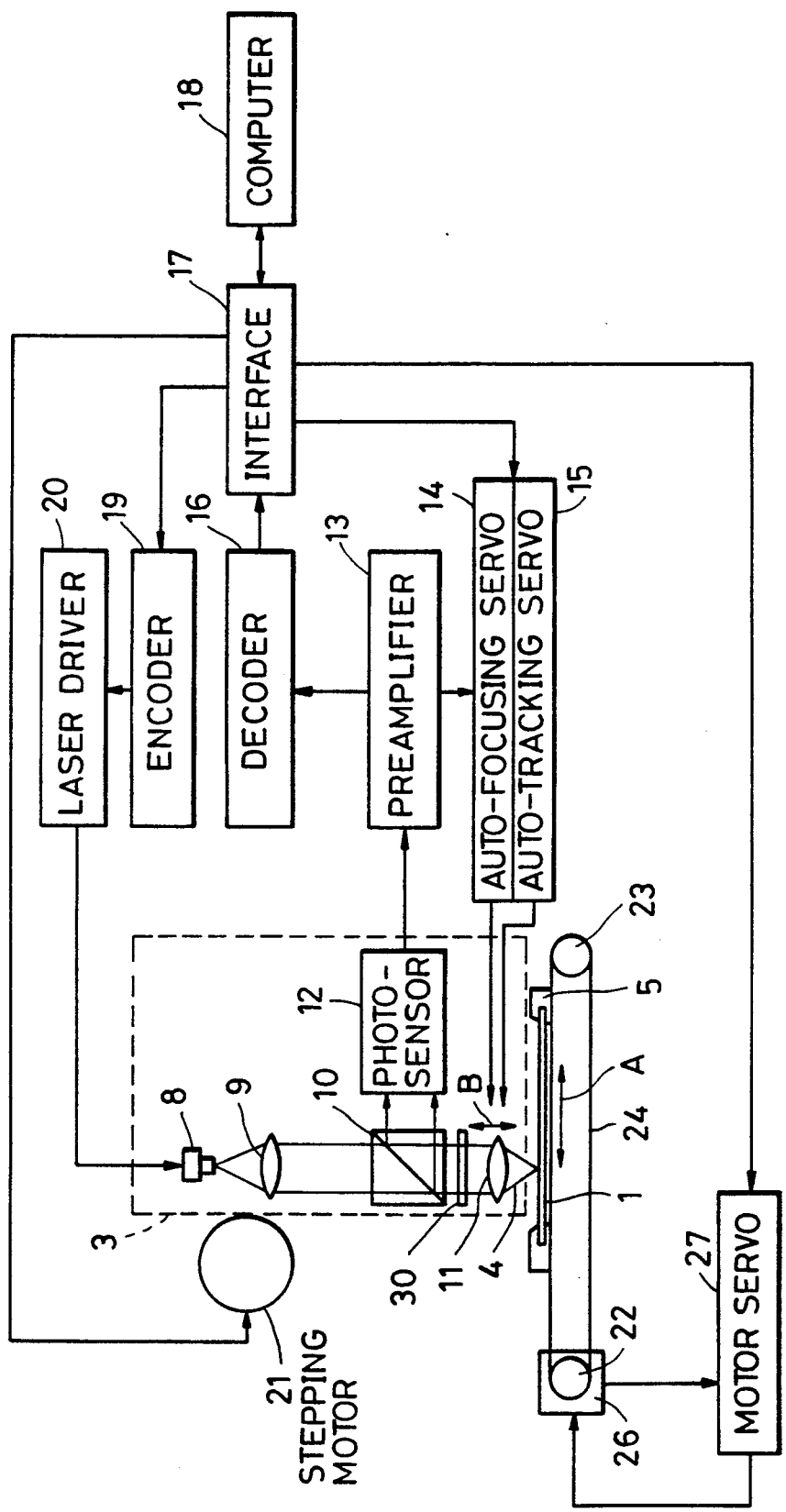
FIG. 1 is a diagram showing a configuration of a conventional apparatus.
Figure 2:
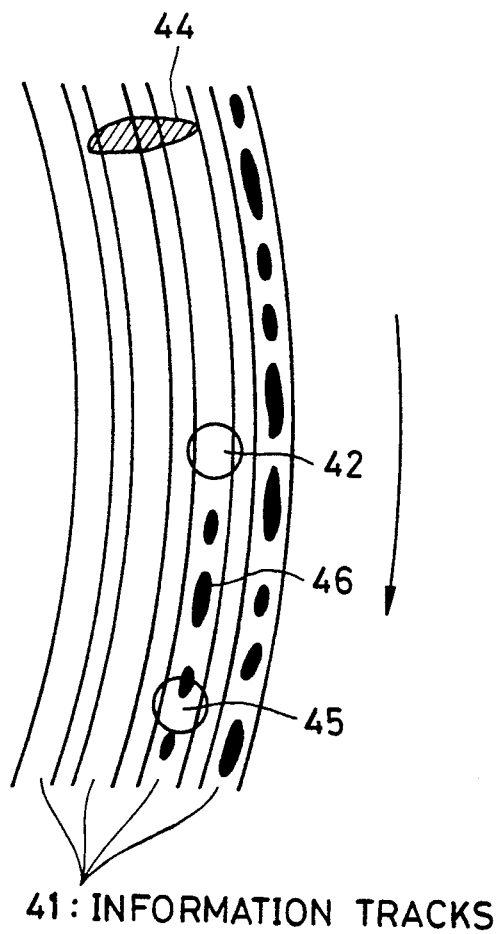
FIG. 2 is a diagram showing the disposition of spots.

Like components which have almost the same functions as those in the apparatus shown in FIG. 1 are indicated by like numerals, and further explanation thereof will be omitted.

In FIG. 3, there are shown a diffraction grating 61, a sensor lens 65, light spots 62, 63 and 64 formed on an optical card 1 as an optical information recording medium, a photosensor 66 and respective photo-sensing units 67, 68 and 69 on the photosensor 66. There are also shown preamplifiers 70, 71 and 72, a switching circuit 73 for switching the functions of said light spots, a control circuit 74, an interface 77 and a computer 78.

In the optical head 3, parallel luminous flux formed by the collimating lens 9 is divided into three beams by a diffraction grating 61. The three beams are focused on the optical card 1 as three spots 62, 63 and 64 by the objective lens 11. The direction of alignment of the three spots is a direction parallel to the direction A of the relative reciprocating movement of the optical card 1 and the spots. The reflected beam from the optical card 1 passes through the ¼ wavelength plate 30 and the polarizing beam splitter 10, and then is focused on the photosensor 66 by the sensor lens 65. In the photosensor 66, there are three photosensing units 67, 68 and 69 each of which converts variations of the amount of light of each beam into variations of electrical characteristics. The outputs from the photosensing units are sent to the corresponding preamplifiers 70, 71 and 72, respectively, and from which they are sent to the switching circuit 73 after a predetermined processing.

Figure 4:
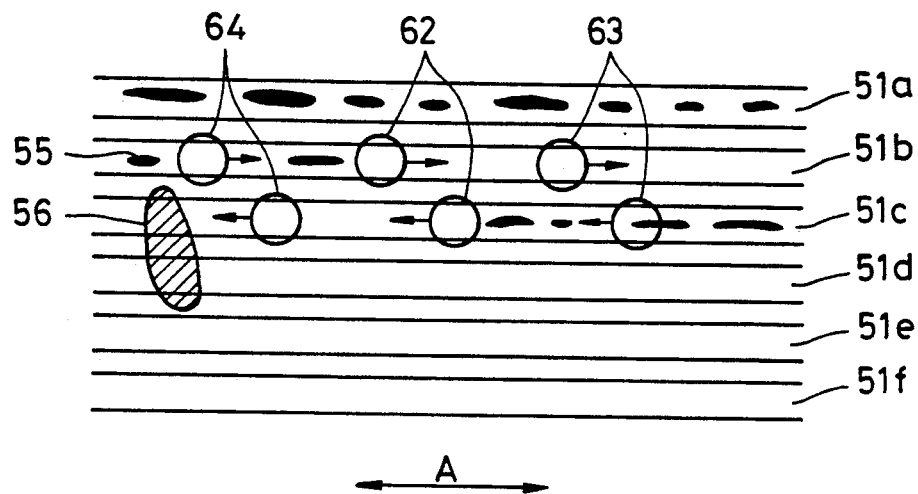
FIG. 4 is a model drawing showing spots on an information recording medium for explaining the above-described embodiment in detail.

Next, the operations after the switching circuit 73 will be explained with reference to FIGS. 3 and 4 together. FIG. 4 is a diagram showing the arrangement of light spots on information tracks on the optical card. In FIG. 4, information tracks 51a, 51b, - - -, 51f on which information is to be recorded are provided parallel to the direction A of the reciprocating movement of the optical card. As explained in connection with FIG. 3, the three spots 62, 63 and 64 are located on the same information track 51b. That is, the direction of alignment of the three spots is a line parallel to the direction of the information track. Now, consider a case in which information is recorded as a pit 55 on the information track 51b. The intensities of the three spots 62, 63 and 64 formed by the diffraction grating 61 are different. At least, the intensity of the central spot 62 is larger than those of the adjacent spots 63 and 64. The command of recording and the content of recording from the computer 78 are transmitted via the interface 77 and the encoder 19 to the laser driver 20, and drive the laser 8 by predetermined modulating recording signals. In accordance with the modulating recording signals, the recording of information is performed on the information track 51b by the spot 62. The spot 64 reads the written information immediately after recording. The output from the photo-sensing unit 69 and the preamplifier 72 corresponding to the spot 64 is transmitted from the switching circuit 73 to the decoder 16 and reproduction immediately after recording is performed. The reproduced information is transmitted to the interface 77. In the interface 77, a comparison between the reproduced information and the information originally to be recorded is performed. When it is judged that the recording has not been performed normally, a command is issued, for example, to record again on the adjacent information track 51c.

Further, the spot 64 for confirmation itself is also modulated by the recording information. Hence, it is possible to obtain correct information by transmitting the recording modulating information from the interface 77 to the preamplifiers 70, 71 and 72 by a command (not illustrated), and collating and correcting the information within the preamplifier 72.

Now, the role of the spot 63 in recording on the information track 51b will be explained. The spot 63 monitors the state of the information track 51b immediately before recording by the spot 62. When some kind of foreign matter or defect is present, such presence appears as variations of the amount of light arriving at the photo-sensing unit 68. Signals from the photo-sensing unit 68 are transmitted via the preamplifier 71 and the switching circuit 73 to the control circuit 74. Within the control circuit 74, the magnitude, continuing time interval or the like of the output from the switching circuit are investigated. When it is judged that the result is not acceptable, commands are issued to the auto-focusing servo 14 and the auto-tracking servo 15 so as to hold the state of each of those two servos. The time width of holding may be until it is confirmed by the signals from the preamplifier 71 that the spot 63 has passed over the foreign matter and the signal has returned to a predetermined level, or until a predetermined time interval has passed. Thus, it is possible to promptly relocate the spots 62, 63 and 64 on the information track 51b. It is communicated from the control circuit 74 to the interface 77 that foreign matter having a large adverse influence is present on the information track 51b, and the above-described control has been performed. According to this signal, the interface 77 sends commands to each unit that the information is to be recorded again on the information track 51c, or on an information track separated from track 51b by one or plural tracks, if the defect is larger than the width of a single information track.

Next, a case in which information is recorded on the information track 51c in FIG. 4 will be explained. In recording on the information track 51b described above, information is recorded from left to right (hereinafter provisionally termed "forward movement") in FIG. 4. Recording on the adjacent track 51c is performed, however, from right to left (that is, recording is performed during backward movement) in FIG. 4 for the purpose of increasing the recording speed. In the relative reciprocating relationship between the optical head 3 and the optical card 1 at normal reproduction (for example, in FIG. 4, an apparatus which reads information always from left to right for reproduction), it is also possible, for example, to record while reversing the alignment of the information covering one track at recording. In recording on the information track 51c, the functions of the spots 63 and 64 are reversed, and confirmation immediately after recording is performed by the spot 63. That is, the interface 77 judges whether the direction of movement of the optical card 1 is the forward direction or the backward direction, and transmits the information, to the switching circuit 73. According to the information, the switching circuit 73 transmits signals from the preamplifier 72 during forward movement, and signals from the preamplifier 71 during backward movement, to the decoder 16 after recording for the above-described purpose of immediate confirmation.

Further, the role of the spot 64 in recording on the information track 51c will be explained. The spot 64 monitors the state of the information track 51c immediately before recording by the spot 62. When some kind of foreign matter or defect 56 is present, such presence appears as variations in the amount of light arriving at the photo-sensing unit 69. Signals from the photo-sensing unit 69 are transmitted via the preamplifier 72 and the switching circuit 73 to the control circuit 74. Within the control circuit 74, the magnitude, continuing time interval or the like of the output from the switching circuit are investigated. When it is judged that the result is not acceptable, commands are issued to the auto-focusing servo 14 and the auto-tracking servo 15 to hold the state of each of the two servos. The time width of holding may be, for example, until it is confirmed by the signals from the preamplifier 72 that the spot 64 has passed over the foreign matter 56 and the signal has returned to a predetermined level, or until a predetermined time interval has passed. Thus, it is possible to promptly relocate the spots 62, 63 and 64 on the information track 51c. It is communicated from the control circuit 74 to the interface 77 that a foreign matter having a large adverse influence is present on the information track 51c, and the above-described control has been performed. According to this signal, the interface 77 sends commands to each unit that the information is to be recorded again on the information track 51d, or on an information track separated from track 51c by one or plural tracks, if the defect is larger than the width of a single information track. As described above, it is the spot 64 which monitors on the track on the occasion of recording on the information track 51c (the backward movement), but the spot 63 performs this role on the occasion of recording on the information track 51b (the forward movement). For this purpose, the switching circuit 73 selects the information from the preamplifiers 71 and 72 according to the information on the forward movement and the backward movement from the interface 77, performs switching and transmits to the control circuit 74.

As is apparent from the above explanation relating to FIGS. 3 and 4, it is possible to achieve a stable and correct recording of information without sacrificing the recording speed, by setting a spot for confirming the recorded information by reproducing immediately after recording, and a spot for detecting an abnormality on the information track immediately before recording on a given information track, and by providing means for switching the roles of these spots during forward movement and backward movement of the optical card.

Now, the operation of other embodiments will be shown and described, relating to the modification of the functions among plural spots in the present invention, in connection with FIGS. 5 through 8.

In FIGS. 5 through 8, the black spots have the function of confirmation immediately after recording. The spots shown cross-hatched have the function of monitoring abnormalities on the information track before recording. The spots shown as white circles are those used for the function of performing recording or auto-focusing and auto-tracking. In each of FIGS. 5 through 8, it is assumed that recording is performed from left to right on the information track 51b, and from right to left on the information track 51c. The direction of the alignment the of spots is, of course, a line parallel to the direction A of the relative reciprocating movement of the information recording medium and the spots.

Figure 5:
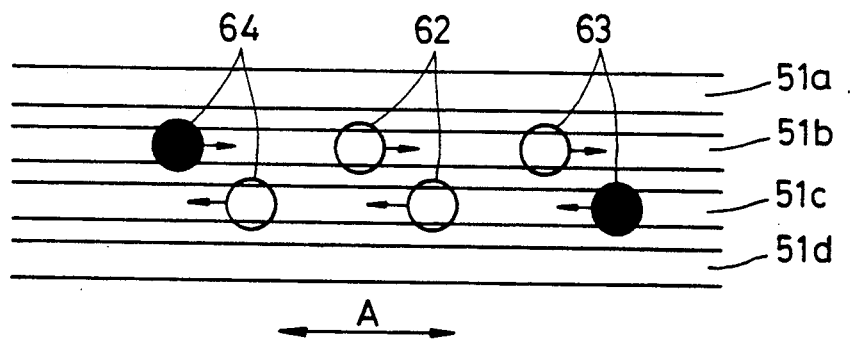
FIG. 5 is a model drawing showing an example in which only the function of confirming immediately after recording is switched for forward and backward movement.

The embodiment whose operation is illustrated in FIG. 5 is an example in which only the function of confirming operation immediately after recording is switched for forward movement and for backward movement between the two spots 63 and 64. This is an example in which mainly a high-speed and correct recording is aimed at while attempting the simplification of circuit configuration. Here, the spot 62 has the function of recording both during forward movement and during backward movement.

Figure 6:
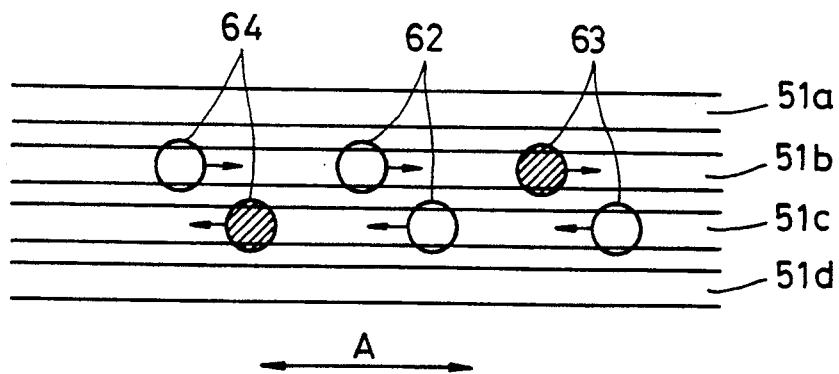
FIG. 6 is a model drawing showing an example in which only the function of monitoring before recording is switched for forward and backward movement.

The embodiment whose operation is illustrated in FIG. 6 is an example in which only the function of monitoring before recording is switched for forward movement and for backward movement between the two spots 63 and 64. This is also an example in which mainly a high-speed and stable recording is aimed at while attempting the simplification of circuit configuration. Here, the spot 62 has the function of recording both during forward movement and during backward movement.

Figure 7:
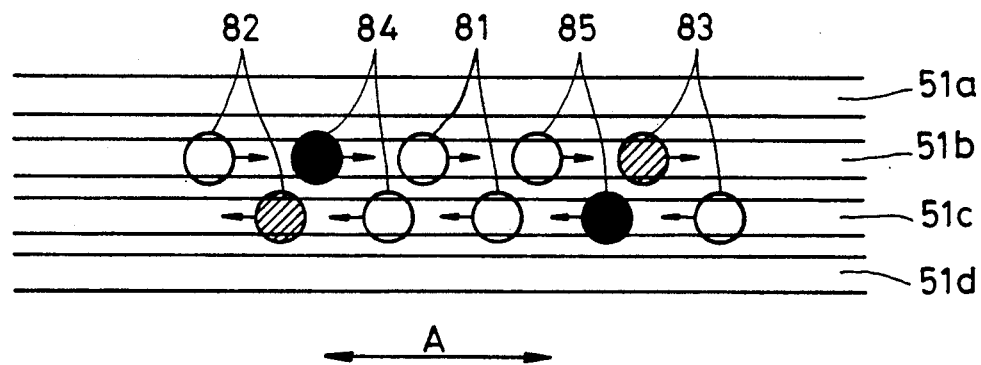
FIG. 7 is a model drawing showing an example in which five spots are located on the same track.

The embodiment whose operation is illustrated in FIG. 7 is an example in which five spots 81 through 85 are located on the same information track, and the functions are switched. Since the potential function of each spot is unique (for example, whether the spots 82 and 83 perform the monitoring function or not, i.e., whether they have the monitoring function or not), the circuit configuration, such as the preamplifier unit or the like, becomes simple. That is, since the spots 84 and 85 may have only the function of confirming operation, and the spots 82 and 83 may also have only the monitoring function, a switching circuit for switching the function of each spot is unnecessary, and thus the circuit configuration becomes simple. Here, the spot 81 has the function of recording both during forward movement and during backward movement.

Figure 8:
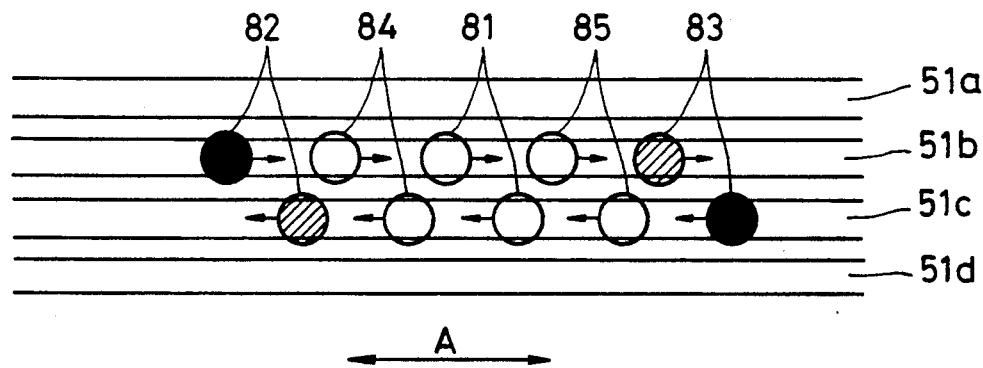
FIG. 8 is a model drawing showing spots on an information recording medium for another embodiment of the present invention.

In the embodiment whose operation is illustrated in FIG. 8, the recording confirming function and the monitoring function are switched between the two spots 82 and 83. Further, during forward movement (on the information track 51b), auto-tracking is performed by the spot 84 and auto-focusing is performed by the spot 85, and during backward movement (on the information track 51c), auto-tracking is performed by the spot 85 and auto-focusing is performed by the spot 84. Here, the spot 81 has the function of recording both during forward movement and during backward movement.

In the embodiments described above, as the functions to be switched, the confirming function and the monitoring function have been mainly exemplified, but the functions to be switched are not necessarily limited thereto. Switching is possible even for spots having several functions which correspond to several recording media and methods, such as the preheating function for preheating the medium immediately before recording or the like.

In the above-described embodiment whose operation is illustrated in FIG. 8, the spots having the auto-focusing servo and auto-tracking servo functions have been provided ahead of and behind the spot 81 having the function of information recording. However, the spots having the functions of servo are preferably located ahead of, or leading the spot having the function of information recording relative to the moving direction of the spots. This is because servo signals are influenced by recorded pits when the spots having the functions of servo are located behind or trailing the spot having the function of information recording.

Further, in the above-described embodiment, the position of the spot having the function of recording among plural spots has not been changed between forward movement and backward movement. That is, among the functions of spots, the function of recording has not been switched between forward movement and backward movement. This is because, in the above-described embodiment, a diffraction grating is adopted as means for generating plural spots. When plural spots are generated by a diffraction grating, the intensities of spots are different, and it is arranged so that the spot having the function of recording has an intensity larger than that of other spots. Accordingly, it is difficult to change the position of the spot having the function of recording among plural spots. It is also possible to consider providing plural lasers, or using a laser array incorporated in a single chip in order to generate plural spots. Here, the spot having the function of recording must be capable of intensity modulation in accordance with the presence or absence of information, but the spots having the functions, such as confirming function, monitoring function or the like, have no particular such necessity of modulation. Consequently, mutual exchange of the spot having the function of recording and the spots having the functions, such as confirming function, monitoring function or the like, results in complication of the control circuit of the laser driver or the like. Hence, it is preferable that, among the functions of spots, the function of recording is not switched between forward movement and backward movement.

Figure 9:
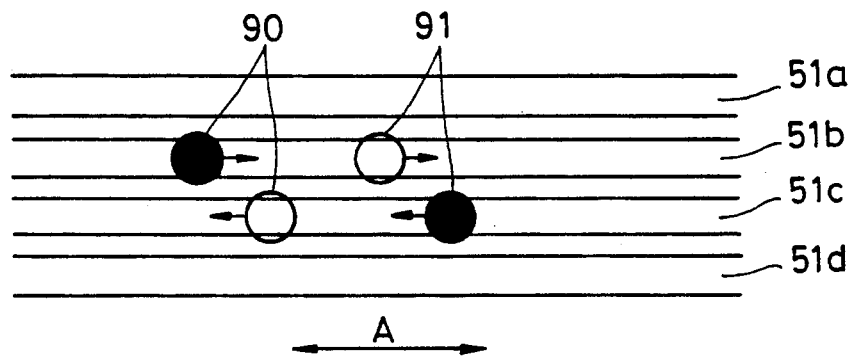
FIG. 9 is a model drawing showing a variation on the configuration used in FIG. 5.
Figure 11:
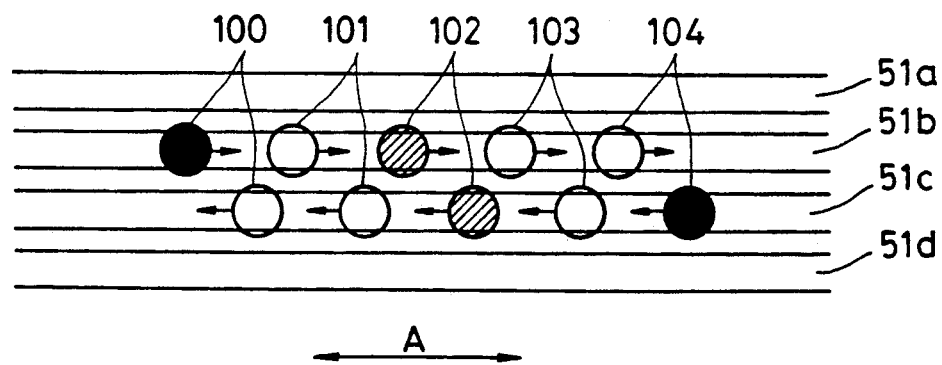
FIG. 11 is a model drawing showing a configuration with both a spot having a function of monitoring and a spot having a function of confirmation.

In the above-described embodiment, the position of the spot having the function of recording among plural spots has not been changed. However, the configurations of embodiments whose operation is illustrated in the following FIGS. 9 and 11 are also possible, with the assumption that certain measures, such as arrangement of the disposition of the photosensor and pluralization of the same or the like, are made. The direction of alignment of the spots is, of course, a direction parallel to the direction A of the relative reciprocating movement of the information recording medium and the spots.

Figure 10:
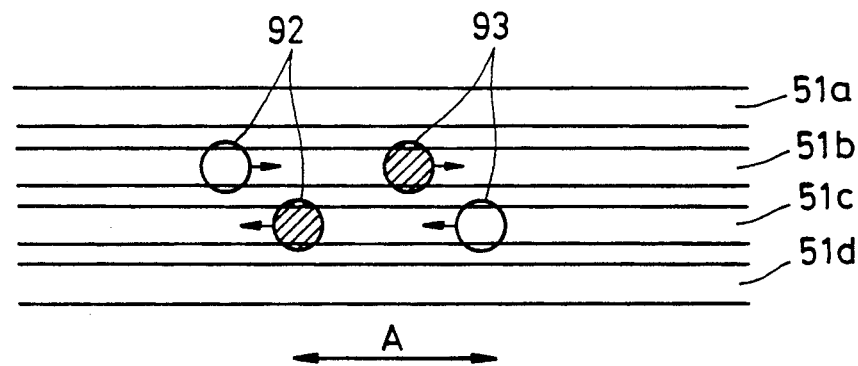
FIG. 10 is a model drawing showing a variation on the configuration shown in FIG. 6.

FIG. 9 relates to an embodiment in which the configuration shown in FIG. 5 can be effected by two spots 90 and 91. It has a configuration such that the spot having the function of recording and the spot having the recording confirming function are mutually exchanged according to the scanning direction (the direction of movement). Here, switching and control are performed so that, between the two spots 90 and 91, the forward or leading spot, relative to the direction of the relative movement, has the function of information recording, and the rear or trailing spot, has the function of information reproduction (confirmation of recording). In this configuration, it is possible to record information and simultaneously reproduce the recorded information during both the forward movement and the backward movement. Further, it will be easily understood that the method of the present embodiment described above is also applicable to the case shown in FIG. 6, in which a spot having the function of monitoring is used. Such example is shown in FIG. 10. This has a configuration such that two spots 92 and 93 are used, and the spot having the function of monitoring and the spot having the function of recording are mutually exchanged according to the scanning direction (the direction of movement). Here, switching and control are performed so that, between the two spots 92 and 93, the forward or leading spot, relative to the direction of the relative movement, has the function of monitoring, and the rear or trailing spot, has the function of information recording. In this configuration, a stable recording of information is possible during both the forward movement and the backward movement.

FIG. 11 shows a configuration provided with both the spot having the function of monitoring and the spot having the function of confirmation. There are five spots 100 through 104. During forward movement (on the information track 51b), information is recorded by the spot 101, monitoring is performed by the spot 102 and confirmation is performed by the spot 100. During backward movement (on the information track 51c), information is recorded by the spot 103, monitoring is performed by the spot 102 and confirmation is performed by the spot 104.

The present invention has special merits not only in recording, but also in reproducing. For example, when reproduction is performed at each operation of the forward movement and the backward movement, it is possible to achieve a high speed reproduction with a configuration such that the spot having the function of monitoring flaws in the recording medium is scanned preceding the spot having the function of reproduction.

Figure 12:
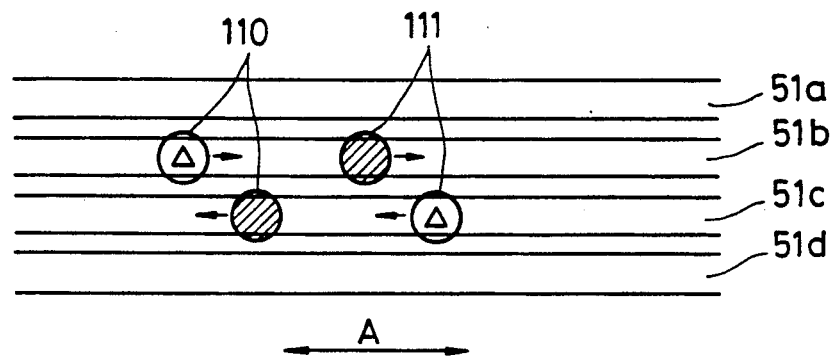
FIG. 12 is a model drawing showing the direction of alignment of two spots being in a line parallel to the direction of a relative reciprocating movement of the information recording medium.

The example is shown in FIG. 12. The direction of alignment of two spots 110 and 111 is a line parallel to the direction A of the relative reciprocating movement of the information recording medium and the spots. Here, switching and control are performed so that, between the two spots 110 and 111, the forward or leading spot, relative to the direction of the relative movement has the function of monitoring, and the rear or trailing spot has the function of information reproduction. In this configuration, a stable reproduction of information is possible during both the forward movement and the backward movement.

Figure 13:
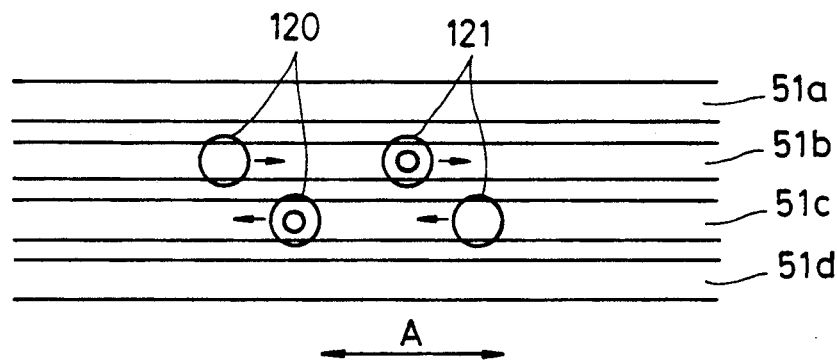
FIG. 13 is a model drawing showing a configuration wherein two spots are used, one having a function of erasing and the other having a function of recording, which are mutually exchanged according to scanning direction.
Figure 14:
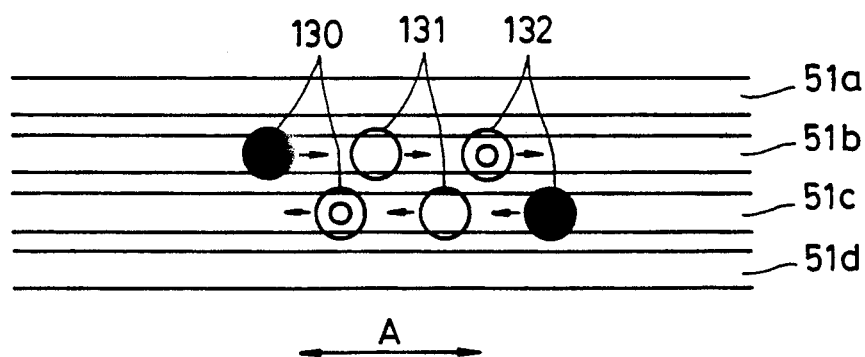
FIG. 14 is a model drawing showing a configuration having three spots for recording information, erasing, and confirming, which are mutually exchanged between the remaining spots according to the scanning direction.

The present invention has special merits not only in recording and reproducing, but also in erasing. Examples are shown in FIGS. 13 and 14. The direction of alignment of plural spots is a line parallel to the direction A of the relative reciprocating movement of the information recording medium and the spots. FIG. 13 has a configuration such that two spots 120 and 121 are used, and the spot (represented by a double circle) having the function of erasing and the spot (represent by a circle) having the function of recording are mutually exchanged according to the scanning direction (the direction of movement). Here, switching and control are performed so that, between the two spots 120 and 121, the forward or leading spot, relative to the direction of the relative movement has the function of erasing, and the rear or trailing spot has the function of information recording. In this configuration, it is possible to record and erase information during both the forward movement and the backward movement. Further, FIG. 14 has a configuration such that three spots 130, 131 and 132 are used, and information recording is performed by the spot 131, and the function of erasing and the function of confirmation are mutually exchanged between the remaining two spots 130 and 132 according to the scanning direction (the direction of the movement). In this configuration, a stable erasing and recording of information is possible during both the forward movement and the backward movement.

In the embodiments described above, no particular explanation has been made about the spots having the functions of auto-focusing and auto-tracking except in connection with FIG. 8. The spots having the other functions, such as the spot having the function of recording, the spot having the function of reproduction, the spot having the function of confirmation, the spot having the function of erasing or the like may simultaneously have these functions of servo, or other spots having these functions of servo may be provided separately.

Further, in the example shown in FIG. 3, as means for switching the functions of spots, there has been shown a configuration in which signals from the detector are switched. However, the apparatus may also be configured such that the optical head is rotated 180° centering around an axis parallel to the normal of the information recording medium between forward movement and backward movement, and thus the positions of the spots are mutually exchanged.

In the embodiments described above, as means for generating a plurality of luminous fluxes, a diffraction grating has been adopted, but a plurality of lasers or a laser array incorporated in a single chip may also be provided. Further, although no explanation about concrete techniques of auto-focusing and auto-tracking has been made, the well-known astigmatism auto-focusing and push-pull auto-tracking, for example, may be applicable, and other techniques may also be applicable. Of course, when auto-focusing or auto-tracking is unnecessary, there is no need of provision thereof.

As explained above, according to the optical information recording and reproducing apparatus of the present invention, in an optical information recording and reproducing apparatus for recording and/or reproducing information while performing a relative reciprocating movement between a recording and/or reproducing head and an optical information recording medium having information tracks, plural spots including a spot having the function of recording and/or reproducing information formed on said recording medium by said head are arranged so as to be located on the same information track in said recording medium. Further, by switching the functions which at least two spots have during forward movement and during backward movement of said relative movement, it is possible to arrange the spots having roles in accordance with the recording and reproducing apparatus and have them function in a predetermined order. Thus, the present invention has an effect that a stable and correct recording and/or reproduction of information with high speed becomes possible.

We claim:

1. An optical information recording and/or reproducing apparatus for recording and reproducing information while relatively reciprocating plural spots and an optical information recording medium including a plurality of parallel tracks, said apparatus comprising:
    spot-forming means for forming plural spots having operating functions and including a spot having an operating function of recording and/or reproducing information on the optical information recording medium, said plural spots being aligned on a common track;
    means for relatively reciprocating said spot-forming means and the optical information recording medium parallel to the tracks; and
    means for switching the operating functions of at least two spots among said plural spots, in accordance with forward relative movement and backward relative movement between said spot-forming means and the optical information recording medium, so that the operating functions of at least two spots are exchanged, wherein the operating functions exchanged comprise a function of recording or a function of reproducing information.

2. An optical information recording and/or reproducing apparatus according to claim 1, wherein the optical information recording medium is an optical card.

3. An optical information recording and/or reproducing apparatus according to claim 1, wherein, among said plural spots, two spots are those whose functions are to be switched, and said two spots are respectively immediately ahead of and behind the spot having the function of recording and/or reproducing.

4. An optical information recording and/or reproducing apparatus according to claim 1, wherein the function of recording is not switched in accordance with the forward relative movement and the backward relative movement, when there are more than two spots.

5. An optical information recording and reproducing apparatus according to claim 1, wherein at least one of said plural spots has an intensity different from the other spots.

6. An optical information recording and/or reproducing apparatus for recording and reproducing information while relatively reciprocating plural spots and an optical information recording medium including a plurality of parallel tracks, said apparatus comprising:
    spot-forming means for forming plural spots including a spot having a function of recording information on and a spot having a function of reproducing information from the optical information recording medium, said plural spots being aligned on a common track;
    means for relatively reciprocating said spot-forming means and the optical information recording medium parallel to the tracks; and
    means for switching with respect to each other the relative positions of at least said spot having the function of recording information and said spot having the function of reproducing information, in accordance with forward relative movement and backward relative movement affected by said reciprocating means.

7. An optical information recording and reproducing apparatus for recording and reproducing information while relatively reciprocating plural spots and an optical information recording medium, said apparatus comprising:
    spot-forming means for forming plural spots including a spot having a function of recording information on and a spot having a function of reproducing information from the optical information recording medium, said plural spots being aligned in a predetermined direction;
    means for relatively reciprocating said spot-forming means and the optical information recording medium parallel to said predetermined direction; and
    means for switching the functions of a first spot and a second spot so that, among said first and second spots, during forward relative movement between said spot-forming means and the optical information recording medium, information is recorded on the optical information recording medium by the first spot and information is reproduced from the optical information recording medium by the second spot, and during backward relative movement between said spot-forming means and the optical information recording medium, information is reproduced the said optical information recording medium by the first spot and information is recorded on the optical information recording medium by the second spot.

8. An optical information recording and reproducing apparatus for recording and/or reproducing information while relatively reciprocating plural spots and an optical information recording medium, said apparatus comprising:
    spot-forming means for forming plural spots including a spot having a function of recording and/or reproducing information on the optical information recording medium, said spots being aligned in a predetermined direction;
    means for relatively reciprocating said spot-forming means and the optical information recording medium in said predetermined direction;
    means for recording and/or reproducing information by irradiating a first spot, among said plural spots, on the optical information recording medium;
    means for detecting, by irradiating second and third spots immediately ahead of and behind said first spot on the optical information recording medium, at least one of an abnormality in the recording medium and the information recorded on the recording medium by at least one spot in the group consisting of said second and third spots; and means for switching a detecting function of said second spot and third spot, in accordance with forward relative movement and backward relative movement effected by said reciprocating means.

9. An optical information recording and/or reproducing apparatus for recording and/or reproducing information while relatively reciprocating plural spots and an optical information recording medium including a plurality of parallel tracks, said apparatus comprising:

control means for controlling said apparatus;

spot-forming means for forming plural spots including a spot having a function of recording and/or reproducing information on the optical information recording medium, said spots being aligned on a common track;

means for relatively reciprocating said spot-forming means and the optical information recording medium parallel to the tracks;

first detection means for detecting light reflected from the optical information recording medium by a first spot among said spots;

second detection means for detecting the reflected light from the optical information recording medium by a second spot among said spots; and means for switching signals from said first detection means from a first input of said control means used for monitoring a state of the optical information recording medium to a second input of said control means used for reproducing information recorded on the optical information recording medium and signals from said second detection means from the second input of said control means to the first input of said control means, in accordance with forward relative movement and backward relative movement affected by said reciprocating means.

10. An optical information recording and/or reproducing apparatus for recording and/or reproducing information while relatively reciprocating plural spots and an optical information recording medium, said apparatus comprising:

spot-forming means for forming plural spots having operating functions, and including a spot having an operating function of recording and/or reproducing information, said plural spots being aligned on a common track on the optical information recording medium;

means for relatively reciprocating said spot-forming means and the optical information recording medium; and means for switching the operating functions of at least two spots among said plural spots, in accordance with forward relative movement and backward relative movement between said spot-forming means and the optical information recording medium, so that the operating functions of at least two spots are exchanged, wherein the operating function exchanged comprise a function of recording or a function of reproducing information.

11. An optical information recording and reproducing apparatus for recording and/or reproducing information while relatively reciprocating plural spots and an optical information recording medium, said apparatus comprising:

spot-forming means for forming plural spots including a spot having a function of recording information and a spot having a function of reproducing information, said plural spots being aligned on one track on the optical information recording medium;

means for relatively reciprocating said spot-forming means and the optical information recording medium; and means for switching with respect to each other the relative positions of at least said spot having the function of recording information and said spot having the function of reproducing information, in accordance with forward relative movement and backward relative movement effected by said reciprocating means.

12. A method for recording and/or reproducing information while relatively reciprocating plural spots and an optical information recording medium, said method comprising the following steps:

a step of forming plural spots having operating functions and including a spot having an operating function of recording and/or reproducing information, said plural spots being aligned on a common track on the optical information recording medium;

a step of relatively reciprocating said spots and the optical information recording medium; and a step of switching the operating functions of at least two spots among said plural spots, in accordance with forward relative movement and backward relative movement in said reciprocating step, so that the operating functions of at least two spots are exchanged, wherein the operating functions exchanged comprise a function of recording or a function of reproducing information.

13. A method for recording and/or reproducing information while relatively reciprocating plural spots and an optical information recording medium, said method comprising the following steps:

a step of forming plural spots having various functions including a spot having a function of recording and/or reproducing information, said plural spots being aligned on one track on the optical information recording medium;

a step of relatively reciprocating said spots and the optical information recording medium; and a step of switching with respect to each other the relative positions of at least two spots among said plural spots, in accordance with the forward relative movement and the backward relative movement in said reciprocating step.

14. A method for recording and/or reproducing information while relatively reciprocating plural spots and an optical information recording medium, said method comprising the following steps:

a step of forming a first spot and a second spot including a spot having a function of recording and/or reproducing information, said first and second spots being aligned on a same track on the optical information recording medium;

a step of generating signals from said first and second spots;

a step of relatively reciprocating said first and second spots and the optical information recording medium; and a step of switching a signal from said first spot from a first input of control means used for monitoring a state of the optical information recording medium to a second input of the control means used for reproducing information recorded on the optical information recording medium and a signal from said second spot from the second input of the control means to the first input of the control means, in accordance with forward relative movement and backward relative movement in said reciprocating step.

15. An optical information recording and/or reproducing apparatus for recording and/or reproducing information while relatively reciprocating three spots and an optical information recording medium, said apparatus comprising:

spot-forming means for forming three spots having operating functions, the operating functions comprising a function of recording information, a function of reproducing information or a function of monitoring a state of the recording medium, the three spots including a spot having an operating function of recording information, said three spots being aligned on a common track on the optical information recording medium;

means for relatively reciprocating said spotforming means and the optical information recording medium; and means for exchanging the operating functions of two spots other than the spot having a function of recording information, in accordance with forward relative movement and backward relative movement between said spotforming means and the optical information recording medium, wherein the operating functions exchanged comprise a function of monitoring a state of the recording medium or a function of reproducing information.

16. A method for recording and/or reproducing information while relatively reciprocating three spots and an optical information recording medium, said method comprising the following steps:

a step of forming three spots having operating functions comprising a function of recording information, a function of reproducing information or a function of monitoring a state of the recording medium, the three spots including a spot having an operating function of recording information, said three spots being aligned on a common track on the optical information recording medium;

a step of relatively reciprocating said spots and the optical information recording medium; and a step of exchanging the operating functions of two spots other than the spot having a function of recording information, in accordance with forward relative movement and backward relative movement in said reciprocating step, wherein the operating functions exchanged comprise a function of monitoring a state of the recording medium or a function of reproducing information.

17. An optical information recording and/or reproducing apparatus for recording and/or reproducing information while relatively reciprocating plural spots and an optical information recording medium, said apparatus comprising:

spot-forming means for forming plural spots having operating functions and including a spot having an operating function of recording and/or reproducing information, said plural spots being aligned on a common track on the optical information recording medium;

means for relatively reciprocating said spotforming means and the optical information recording medium; and means for switching the operating function of a spot other than the spot having a function of recording information to another operating function, in accordance with forward relative movement and backward relative movement between said spotforming means and the optical information recording medium, wherein the switched operating function comprises a function of monitoring a state of the recording medium or a function of reproducing information.

18. A method for recording and/or reproducing information while relatively reciprocating plural spots and an optical information recording medium, said method comprising the following steps:

a step of forming plural spots having operating functions and including a spot having an operating function of recording and/or reproducing information, said plural spots being aligned on a common track on the optical information recording medium;

a step of relatively reciprocating said spots and the optical information recording medium; and a step of switching the operating function of a spot other than the spot having a function of recording information to another operating function, in accordance with forward relative movement and backward relative movement in said reciprocating step, wherein the switched operating function comprises a function of monitoring a state of the recording medium or a function of reproducing information.

* * * * *

UNITED STATES PATENT AND TRADEMARK OFFICE
CERTIFICATE OF CORRECTION

PATENT NO. : 5,267,226
DATED : November 30, 1993
INVENTOR(S) : KAZUHIKO MATSUOKA, ET AL.

It is certified that error appears in the above-identified patent and that said Letters Patent is hereby corrected as shown below:

COLUMN 1

Line 38, "1989." should read --1989).--.

COLUMN 11

Line 65, "and" should read --and/or--.

COLUMN 12

Line 47, "produced" should read --produced from--.

COLUMN 13

Line 62, "function" (first occurrence) should read --functions--.
    Line 64, "and" should read --and/or--.

COLUMN 15

Line 31, "spotforming" should read --spot-forming--.

Signed and Sealed this

Twenty-eighth Day of June, 1994

Attest:

BRUCE LEHMAN

Attesting Officer      Commissioner of Patents and Trademarks